(12) United States Patent
Redberg et al.

(10) Patent No.: US 10,057,763 B2
(45) Date of Patent: *Aug. 21, 2018

(54) SOFT TOKEN SYSTEM

(71) Applicant: Fortinet, Inc., Sunnyvale, CA (US)

(72) Inventors: David A. Redberg, Brooklyn, NY (US); Jun Li, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/154,977

(22) Filed: May 14, 2016

(65) Prior Publication Data

US 2016/0262013 A1  Sep. 8, 2016

Related U.S. Application Data

(63) Continuation of application No. 14/791,428, filed on Jul. 4, 2015, now Pat. No. 9,386,014, which is a
(Continued)

(51) Int. Cl.
*H04W 8/24* (2009.01)
*H04L 29/06* (2006.01)
(Continued)

(52) U.S. Cl.
CPC ............... *H04W 8/245* (2013.01); *H04L 9/14* (2013.01); *H04L 9/30* (2013.01); *H04L 9/3242* (2013.01); *H04L 63/0272* (2013.01); *H04L 63/0442* (2013.01); *H04L 63/06* (2013.01); *H04L 63/067* (2013.01); *H04L 63/083* (2013.01);
(Continued)

(58) Field of Classification Search
None
See application file for complete search history.

(56) References Cited

U.S. PATENT DOCUMENTS 7,664,626 B1    2/2010  Ferrie
9,143,492 B2 *  9/2015  Redberg ............... H04L 63/067
(Continued)

OTHER PUBLICATIONS

Non-Final Rejection for U.S. Appl. No. 14/214,981, dated Feb. 13, 2015.
(Continued)

*Primary Examiner* — Kaveh Abrishamkar
(74) *Attorney, Agent, or Firm* — Hamilton, DeSanctis & Cha LLP

(57) ABSTRACT

Systems and methods for a secure soft token solution applicable to multiple platforms and usage scenarios are provided. According to one embodiment, a user of a mobile device is prompted to input an activation code previously provided to the user by an authentication server, which authenticates credentials provided by users of a secure network resource that is accessible via an IP-based network. A unique device ID of the mobile device is obtained via an API of an operating system of the mobile device. A seed is requested from a provisioning server. The seed is received in encrypted form based on a combination of a secret key, the unique device ID and a hardcoded-pre-shared key. The seed is bound to the mobile device by encrypting the seed based on the unique device ID. When a token is requested by the user it is generated based on the bound seed.

19 Claims, 8 Drawing Sheets

Related U.S. Application Data continuation of application No. 14/214,981, filed on Mar. 16, 2014, now Pat. No. 9,143,492.

(60) Provisional application No. 61/787,811, filed on Mar. 15, 2013.

(51) Int. Cl.
| | | |
|---|---|---|
| *H04W 12/04* | (2009.01) | |
| *H04W 12/06* | (2009.01) | |
| *H04L 9/14* | (2006.01) | |
| *H04L 9/30* | (2006.01) | |
| *H04L 9/32* | (2006.01) | |
| *H04W 88/02* | (2009.01) | |

(52) U.S. Cl.
CPC ...... *H04L 63/0838* (2013.01); *H04L 63/0876* (2013.01); *H04L 63/10* (2013.01); *H04W 12/04* (2013.01); *H04W 12/06* (2013.01); *H04L 2209/80* (2013.01); *H04W 88/02* (2013.01)

(56) References Cited

U.S. PATENT DOCUMENTS

| | | | |
|---|---|---|---|
| 9,386,014 B2* | 7/2016 | Redberg | ............... H04L 63/067 |
| 2003/0204726 A1 | 10/2003 | Kefford et al. | |
| 2005/0039016 A1 | 2/2005 | Aissi et al. | |
| 2005/0289343 A1 | 12/2005 | Tahan | |
| 2010/0313019 A1 | 12/2010 | Joubert | |
| 2011/0123671 A1 | 5/2011 | Hirson et al. | |
| 2011/0276478 A1 | 11/2011 | Hirson et al. | |
| 2012/0144461 A1 | 6/2012 | Rathbun | |
| 2012/0233678 A1 | 9/2012 | Pal | |
| 2012/0240204 A1 | 9/2012 | Bhatnagar et al. | |
| 2014/0281506 A1 | 9/2014 | Redberg et al. | |
| 2015/0312250 A1 | 10/2015 | Redberg et al. | |

OTHER PUBLICATIONS

Notice of Allowance for U.S. Appl. No. 14/214,981, dated Aug. 19, 2015.

Non-Final Rejection for U.S. Appl. No. 14/791,428, dated Apr. 4, 2016.

Notice of Allowance for U.S. Appl. No. 14/791,428, dated Jun. 2, 2016.

\* cited by examiner

SOFT TOKEN SYSTEM

CROSS-REFERENCE TO RELATED APPLICATIONS

This application is a continuation of U.S. patent application Ser. No. 14/792,428, filed Jul. 4, 2015, now U.S. Pat. No. 9,386,014, which is a continuation of U.S. patent application Ser. No. 14/214,981, filed Mar. 16, 2014, now U.S. Pat. No. 9,143,492, which claims the benefit of U.S. Provisional Application No. 61/787,811, filed Mar. 15, 2013, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2016, Fortinet, Inc.

BACKGROUND

Field of the Invention

Embodiments of the present invention generally relate to the field of data security. In particular, embodiments of the present invention relate to a soft token system that can be used to generate One Time Passwords (OTPs) for two-factor authentication (2FA) for securing Virtual Private Network (VPN) logins, for example, among other use cases.

Description of the Related Art

With the rise of the Internet, most day-to-day activities are performed online. Various types of online activities include, for example, online transactions, accessing Wireless Local Area Networks (WLANs), email, Intranet, Virtual Private Networks (VPNs), and other network resources. Commonly, for each of the online activities, users need to provide credentials, such as a user name and password. For instance, users provide critical/sensitive information, such as bank account information, credit card information, debit card information, smart card information, usernames, passwords, Personal Identification Numbers (PINs) and so forth, while performing online transactions. Such critical information is static in nature and therefore can be intercepted and used by unauthorized individuals. Also, weak passwords are easily susceptible to cracking. Additional threats to sensitive data accessed via online means include malware, viruses, spyware and keyloggers. Thus, there exists a need to provide/enhance security while performing an online activity.

One Time Password (OTP) solutions enable users to perform online activity securely and thus, have gained tremendous popularity over the past few years. An OTP is a type of password that is valid only for one login session or for a limited time. For example, an OTP may be regenerated each time a user desires to log into a website. OTP solutions prove identities more securely because the password for the user keeps changing. Usually, an OTP is based on randomness and is dynamic in nature. For instance, if an intruder steals an OTP value that was already used to conduct an online transaction, he or she will typically not be able to use it since it will be no longer valid. Due to the random nature of OTPs, a next OTP cannot easily be determined based on observations of previously generated OTPs. Thus, OTP solutions provide increased security to users while performing online activity.

Typically, an OTP is generated by hardware-based tokens or software-based tokens. These tokens act like an electronic key to access sensitive information. A hardware-based token is an electronic device carried by a user. The hardware-based token can be easily plugged into a user device and generates an OTP that can be viewed by the user. In contrast, software-based tokens for generating an OTP are typically in the form of an application running on a user's device. Software-based tokens are easy to use as users are not required to carry an additional hardware device.

There exist a number of solutions in the market offering token-based OTP solutions; however, there are many disadvantages associated with current solutions. One of the disadvantages of software-based tokens is that the solutions follow the approach of binding a token to a user device only at the time of importing the token seed from a server and such binding does not persist thereafter. Additionally, the token seed is generated on an external server, and thus, is exposed. Furthermore, prior solutions focus on manual effort to collect the device ID. For example, a user of the device must typically manually enter the device ID upon request into the token generating application on the server side. Alternatively, an administrator of the server side must manually collect the device ID from the device. Existing solutions further focus on administering the device ID from a central location like a server. Moreover, existing solutions fail to provide out-of-band authentication to users. Also, current solutions are not compatible with different types/versions of user devices. Known solutions are further limited to managing a fixed token size (e.g., 128-bit tokens). Additionally, existing solutions are limited in that they cannot be integrated with various platforms.

SUMMARY

Systems and methods are described for a secure soft token solution applicable to multiple platforms and usage scenarios. According to one embodiment, a user of a mobile device is prompted by a soft token application installed on the mobile device to input an activation code previously provided to the user by an authentication server, which authenticates credentials provided by users of a secure network resource that is accessible via an Internet Protocol (IP)-based network. A unique device ID of the mobile device is programmatically obtained by the soft token application via an Application Programming Interface (API) of an operating system of the mobile device. A token seed, for use in connection with generating a token for obtaining access to the secure network resource, is requested by the soft token application via the IP-based network from a provisioning server associated with the soft token application by sending a request containing (i) a cryptographic hash of the unique device ID or the unique device ID and (ii) the activation code to the provisioning server. The token seed is received by the soft token application in encrypted form. The encryption key used to generate the encrypted form is based on a combination of a secret key, the unique device ID and a hardcoded-pre-shared key. The token seed is bound by the soft token application in a persistent manner to the mobile device by encrypting the token seed based on the unique device ID. When the token is requested by the user, the soft token application generates the token based on the bound token seed.

Other features of embodiments of the present invention will be apparent from the accompanying drawings and from the detailed description that follows:

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
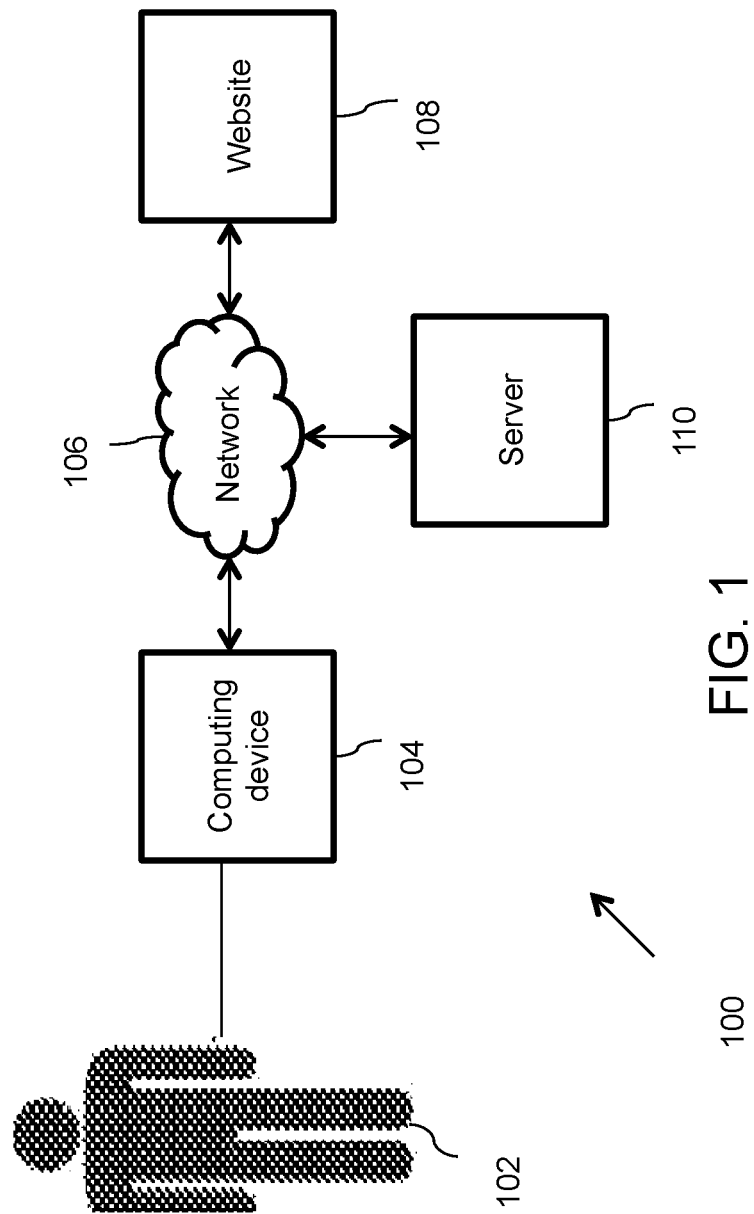
FIG. 1 conceptually illustrates an exemplary environment in which various embodiments of the present invention can be practiced.

Systems and methods are described for a secure soft token solution applicable to multiple platforms and usage scenarios. According to one embodiment, a method of soft token management includes selecting a token of one or more tokens available within a soft token application. The soft token application is installed on a user device. The method further includes automatically obtaining a unique device ID of the user device locally via an Application Programming Interface (API). Further, the method includes checking binding of the selected token with the ID of the user device. Moreover, the method includes generating a One Time Password (OTP) value for a secure network resource using predefined algorithms. The OTP value is then used to access the secure network resource. Examples of secure network resources include, but are not limited to, Virtual Private Networks (VPNs), payment and security platforms, Wi-Fi networks and transaction-oriented web applications.

Initially, a user initiates a token application on his/her device. In an embodiment of the present invention, the token application has multiple tokens installed on it. According to that embodiment, the user selects a token of the multiple tokens available with the application. After this, the device ID of the user device is collected locally via an Application Programming Interface (API). Then, a value, for example, cryptographic hash of the device ID is calculated. Thereafter, a check is performed to determine whether the device ID as obtained matches with the device ID stored over a network. Then, it is checked whether the token is bound to the device ID or not. When the result of the check performed is false, the method stops. When the result of the check performed is true, then an OTP value corresponding to the selected token is generated.

In an embodiment of the present invention, the OTP value is generated by applying an algorithm on a seed corresponding to the selected token. Subsequently, the user uses the OTP value to perform an online activity, for example, but not limited to, accessing Virtual Private Network (VPN). In an embodiment of the present invention, one more check is performed to determine whether the OTP value input by the user is correct.

In case the input is correct, the user is allowed to connect to the VPN and accordingly the VPN is accessed by the user. Subsequently, the user is connected to corporate network via the VPN. Else, the VPN connection with the user device is not completed. In addition to this, in case the user wishes to access the VPN next time, he or she is allocated with a new OTP.

In an embodiment of the present invention, the token application may be protected by a Personal identification Number (PIN).

In an embodiment of the present invention, tokens of varying size may be managed within the soft token application.

In an embodiment of the present invention, the token is dynamically provisioned.

In an embodiment of the present invention, the user device is connected to an authentication server over a network. In an embodiment of the present invention, the authentication server authenticates the user for using one or more tokens installed on the user device. In another embodiment of the present invention, the user is authenticated to use the OTP value generated by the token application and so forth.

In an embodiment of the present invention, the user device is connected to a provisioning server over a network. The provisioning server initiates one or more tokens for the user device. In an embodiment of the present invention, the provisioning server communicates with the authentication server over the network.

Embodiments of the present invention further relate to a detailed token-based solution; the token-based solution is in the form of an application. Initially, a soft token is assigned to a user. Then, a corresponding seed and an activation code are generated. In an embodiment of the present invention, the seed and the activation code are generated based on random number algorithms as known in the art. Thereafter, a provisioning request is sent including information like user ID, device ID, the seed, the activation code etc. The seed is then encrypted and stored as a part of the user record. After this, a communication is sent to the user via an email, for example, with the activation code and instructions to download the application. Accordingly, the user downloads the application on his/her device, for example, mobile device. Then, the user is prompted to enter the activation code. The user enters the activation code and once the activation code is input by the user, an ID of the user device is obtained.

After this, a request for the token is sent by the user device along with the activation code and the device ID. Then, a verification check is performed to determine whether the activation code and the device ID are correct. Based on the determination, a secret key is generated. The seed is then encrypted with the secret key, device ID and hardcoded pre-shared key. As a next step, a communication is sent to the user with the encrypted seed and the secret key via two separate channels, such as email and a Short Message Service (SMS). By using the two separate channels for authenticating the user, it is ensured that the encrypted seed and the secret key are sent to the correct owner. Then, the user downloads the encrypted token seed to his/her device.

For the successful downloading, the user is prompted to enter the secret key and a validation check is performed. In case of successful validation, the token seed is installed on the application after decrypting it. Finally, the token seed is again encrypted with the device ID, secret key and the hard coded key.

In an embodiment of the present invention, a different OTP value is generated for each token.

In an embodiment of the present invention, a unique seed and a unique activation code are generated for each token.

In an embodiment of the present invention, the delivery of seed is bound to mobile number if the user device is mobile phone, for example. In another embodiment of the present invention, the seed is also bound to the device ID.

In an embodiment of the present invention, an encryption key is formed from a combination of the secret key, the device ID and the hardcoded key. In the similar manner, a decryption key is formed from a combination of the secret key, the device ID, and the hard coded key.

In an embodiment of the present invention, the method as outlined above is executed by a system. The system typically includes various components, like a user device, an authentication server, a provisioning server, a network, a database and so forth. It may be noted that the invention is not limited to the embodiments described herein. There can be many components that can be used for implementing the present invention. In other words, for a person skilled in the art, it is understood that the many modifications to the system as described herein are possible and can be made as per the requirements without deviating the scope of the present invention.

In an embodiment of the present invention, the method as described above is implemented using a Computer Program Product (CPP). The CPP includes computer readable medium, which further includes programs instructions to perform the steps of the method above.

Embodiments of the present invention are advantageous in many ways. Firstly, embodiments facilitate a secure soft token solution for multiple platforms. Various examples of the platforms include, but are not limited to, Virtual Private Network (VPN), Wireless Local Area Network (WLAN), email, Intranet, online transaction, web server, and other network resources. In other words, the soft token application can be integrated with different types of platforms.

Secondly, the present invention generates One Time Password (OTP) for different user devices. Examples of different user devices are desktop, laptop, mobile device, Personal Digital Assistant (PDA), palmtop, tablet, smart phone, etc.

Furthermore, embodiments of the present invention bind tokens to the intended target user device by using a unique device ID programmatically obtained from the target user device as one part of an encryption key used to encrypt the token seed. In this manner, even if the encrypted token seed is copied to another device, the decryption of the encrypted token seed with a different unique device ID will result in invalid OTP values.

Moreover, the present invention facilitates secure/encrypted seed, which is used for generating OTP. In particular, embodiments of the present invention protect the seed by encrypting the seed while it is in transit (e.g., between a provisioning server and the target user device) based on a unique device ID of the target user device, a secret key and a hardcoded pre-shared key.

Additionally, in accordance with embodiments of the present invention, the unique device ID is automatically and programmatically obtained from the user device via an Application Programming Interface (API). Accordingly, automated download assistance regarding a device specific version of the soft token application may be provided to facilitate installation of the soft token application on the user device.

Additionally, embodiments of the present invention provide out-of-band authentication of users by providing users with activation codes in the form of randomized token "serial" numbers via email, phone, SMS, mail or the like.

In order to facilitate understanding of the invention, embodiments of the present invention are described in the context of a mobile device as one example of a user device and a VPN login is used as an exemplary usage scenario; however, it is to be understood that embodiment of the present invention are not so limited. For example, various other types of user devices are thought to benefit from implementations of the present invention and numerous alternative usage scenarios are contemplated.

Embodiments of the present invention are directed towards faciliating secure online transaction, for example, online payments, Internet banking, e-transfer, mobile banking, loan applications, investment, viewing checking and savings account balances, paying mortgages, purchasing financial instruments, certificates of deposit, mobile payment, mobile security, mobile top-up, online purchases, e-commerce etc. Online transactions are sometimes known as e-transactions or Internet transactions. Payments for online transactions are made in various forms including via credit card, debit card and the like. To successfully accomplish online transactions, user credentials are used. Examples of user credentials include, but are not limited to, a user name, a user id, passwords, transaction passwords, Personal Identification Numbers (PINs), security questions, challenge questions, credit card information, debit card information etc. Such credentials are static in nature and are vulnerable to various attacks and associated risks.

In order to overcome such limitations, users are provided with additional credential such as a One Time Password (OTP). Since an OTP is not stored on any system and it changes dynamically, it offers security advantages over traditional passwords especially in the context of conducting secure online transactions.

Other embodiments of the present invention are directed towards providing secure access to corporate networks via Virtual Private Networks (VPNs). In particular, OTPs may be used for enterprise access applications, such as logging into a corporate network from a desktop or via remote access.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this document are given below.

The phrase "Application Programming Interface" and the acronym "API" generally refer to a set of instructions that software programs follow to communicate with each other. An API acts as an interface between different software programs and facilitates interaction between them.

The term "client" generally refers to an application, program, process or device in a client/server relationship that requests information or services from another program, process or device (a server) on a network. Importantly, the terms "client" and "server" are relative since an application may be a client to one application but a server to another.

The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "in accordance with an embodiment", "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

The term "internetwork" generally refers to a way of connecting a computer network with other networks through gateways providing routing of packets between different/similar networks. One of the most common examples of an internetwork is the Internet.

If the specification states a component or feature "may", "can", "could", or "might" be included or have a characteristic, that particular component or feature is not required to be included or have the characteristic. Also, the aforesaid terms are not limiting the invention in any manner.

The term "network" generally refers to a collection of software and hardware components, which are inter-connected via a communication channel to share data and/or resources. Examples of various types of networks include, but are not limited to, Local Area Networks (LANs), Wide Area Networks (WANs), Metropolitan Area Network (MANs), Enterprise Private Networks (EPNs), Virtual Private Networks (VPNs) and Internetworks.

The phrase "out-of-band authentication" generally refers to user authentication over a network or channel separate from the primary network or channel. In one embodiment, the authentication system's challenge and response to a user are communicated via a method (e.g., electronic mail (email) or Short Message Service (SMS)) other than the primary means of accessing the secure resource at issue (e.g., via a public or private network). In one embodiment, two separate networks, for example, an Internet channel, and a secure channel, are used simultaneously to authenticate a user.

The term "seed" generally refers to the input to a random number generator. For example, a seed may be used as a secret random key used to generate a One Time Password. In one embodiment, the seed is a symmetric shared secret generated by and stored on an authentication server and delivered in encrypted form to an end user device. Typically, the OTP generation process takes some initialization value called the "seed". In one embodiment, the seed varies for each instance of a provisioned token.

The term "server" generally refers to an application, program, process or device in a client/server relationship that responds to requests for information or services by another program, process or device (a server) on a network. The term "server" also encompasses software that makes the act of serving information or providing services possible.

The phrase "software token" generally refers to a software version of a security device used to give authorized users access to a secured resource. In one embodiment, a software token corresponds to two-factor authentication security device that is used to authorize an end user for access to one or more services, such as a VPN. Software tokens can be delivered to and stored on any electronic device like a computer, laptop, mobile phone, Personal Digital Assistant (PDA) and the like. Software tokens are also sometimes referred to as authentication token.

The phrase "two-factor authentication" and the acronym "2FA" generally refer to a type of authentication in which a user provides two different forms of identity evidence to prove that they are who they say they are. For example, in accordance with a 2FA protocol a user may provide both a password and a passcode. As such, 2FA is a high level authentication offering enhanced security and is sometimes referred to as providing strong authentication.

The phrase "Virtual Private Network" and the acronym "VPN" generally refer to a network that uses a public telecommunication network to connect remote users or websites. Typically, VPNs uses virtual connections to route data from remote users to a central organization network. VPNs further focus on remote users of the network to be authenticated, and thus, transfer data through an encrypted channel.

FIG. 1 conceptually illustrates an exemplary environment 100 in which various embodiments of the present invention can be practiced. In the present example, a usage scenario involving software tokens will be described. In one embodiment, a token application, which is typically installed on a user device is used to generate one or more One Time Passwords (OTPs). The OTPs are further used to perform one of many different types of online activities, such as a VPN login or otherwise gaining access to a VPN, a Wireless Local Area Network (WLAN), an email account, an Intranet, performing an online transaction, accessing a web server, and/or accessing other secure network resources. Examples of online transactions include, but are not limited to, online payment, Internet banking, e-transfer, mobile banking, loan applications, investment, managing account balances, mobile payment, mobile security, enquiry services, mobile top-up, online purchases, e-commerce and the like. As such, it should be appreciated, in accordance with embodiments of the present invention, the soft token application can be integrated with different types of platforms, including, but not limited to smartphones (e.g., iPhones, Android based mobile devices, mobile devices using the Blackberry operating system, Windows-based mobile devices and the like); and be used in connection with multiple usage scenarios.

FIG. 1 illustrates an exemplary network environment 100 in which various embodiments of the present invention can be practiced. The network environment 100 includes a user 102, a computing device 104, a network 106, a website 108 and a server 110. Computing device 104 is connected to network 106 and network 106 is connected to website 108. Further, network 106 is connected to server 110. Moreover, computing device 104 communicates with server 110 via network 106. Typically, communication between various elements as depicted in FIG. 1 involves two-way communication. In the context of the present example, user 102 uses computing device 104 to access website 108 via network 106.

Various examples of computing device 104 include, but are not limited to, mobile devices, smartphones, laptops, notebooks, netbooks, Personal Computers (PCs), tablets, iPhones, iPads and palmtop computers. Typically, computing device 104 has a display, a memory, a keypad or keyboard, a processor, a rechargeable battery, internal storage, one or more removable media drives, one or more ports, and the like.

In accordance with an embodiment of the present invention, computing device 104 has installed thereon various applications, such as email, calendar, games, videos, ringtones, SMS and instant messaging applications, a banking application, a token application and so forth. Applications, like calendar, games, videos, ringtones, instant messaging can typically be accessed without user credentials. However, applications, like mobile banking are typically accessed only by providing credentials.

In accordance with an embodiment of the present invention, network 106 may be wired or wireless. Examples of various types of network 106 may include, but are not limited to, Local Area Networks (LANs), Wide Area Networks (WANs), Metropolitan Area Networks (MANs), Wireless Local Area Networks, Wi-Fi, Wimax and so forth.

In accordance with one embodiment of the present invention, website 108 is an enterprise access site allowing users to connect to a corporate network via a Virtual Private Network (VPN). Alternatively, website 108 can be a banking website used to, among other things, conduct online transactions. In accordance with various embodiments of the present invention, website 108 may represent a website to access email, a WLAN, a web server or other secure network resources, such as a music download site.

To access data hosted by website 108, user 102 inputs credentials. Exemplary embodiments of website 108 have been mentioned above. Examples of credentials include, but are not limited to, a user name, a user id, and a password. In addition to conventional credentials, in accordance with embodiments of the present invention, user 102 also inputs an OTP. An OTP is used as part of a two-factor authentication to verify the identity of user 102. For example, the OTP may represent a password valid for a one-time login session or for one transaction.

In one embodiment, the OTP is generated by a soft token application (not shown) installed on computing device 104 as discussed in detail further below. Each time user 102 logs into website 108, the OTP is regenerated. As such, the OTP is not subject to replay attacks. In accordance with an embodiment of the present invention, user 102 may be required to input the OTP within a predefined and potentially configurable time limit, e.g., between approximately 30 to 60 seconds from the time of generation. In one embodiment, the OTP expires and is no longer valid outside of the predefined time limit.

Once the credentials are input by user 102, a check is performed by server 110 to ascertain whether the information input by user 102 matches with the login information present within server 110 or an external authentication system (e.g., Remote Authentication Dial-in User Service (RADIUS)). When the login credentials match, user 102 is permitted to perform authorized activities, e.g., corporate network access, VPN access, online payment processing, e-transfer and online purchases. Otherwise, user 102 is denied access to the secure resource and is not allowed to proceed to perform the protected activities. In this manner, the performance of protected activities over the Internet, for example, is limited to authorized individuals and the authentication of such authorized individuals is more reliable.

In accordance with an embodiment of the present invention, user 102 may register with website 108 to perform secured online activities by providing information like first name, last name, age, gender, permanent address, present address, challenge question, e-mail address, phone number, mobile number, date of birth, etc. In addition to the above, user 102 creates a user id and a password that can be used to access website 108 during subsequent sessions. Typically, the registration process is a one-time process. After successfully registering with website 108, an email or SMS message with one or more of user credentials (e.g., an authorization code or PIN) and directions for downloading the soft token application may be sent to user 102. Thereafter, user 102 uses the user id and the password along with a dynamically generated OTP to access website 108 for various purposes, such as bill payments, account overview, and the like.

Each time user 102 wishes to carry out a secured online activity, a new OTP is generated by the soft token application and then the OTP is used along with static information, like a user name and a password, to access the secure resource, e.g., website 108. In various embodiments of the present invention, OTP is dynamic in nature. For example, each time user 102 wants to perform a secured online activity, a different OTP is assigned which can be used for a single session.

In accordance with an embodiment of the present invention, OTP may be of predefined length. In accordance with an embodiment of the present invention, the OTP represents a string of characters (e.g., alphanumeric, numeric or a combination of these). In accordance with an embodiment of the present invention, the OTP may be generated using one or more known algorithms. In an embodiment of the present invention, OTP is generated by applying one or more predefined mathematical algorithms based on one of more of the token seed and the time of day. In one embodiment the time-based OTP value is calculated based on the Time-based One-time Password Algorithm (TOTP) algorithm defined in RFC 6238, which is hereby incorporated by reference in its entirety for all purposes.

Figure 2:
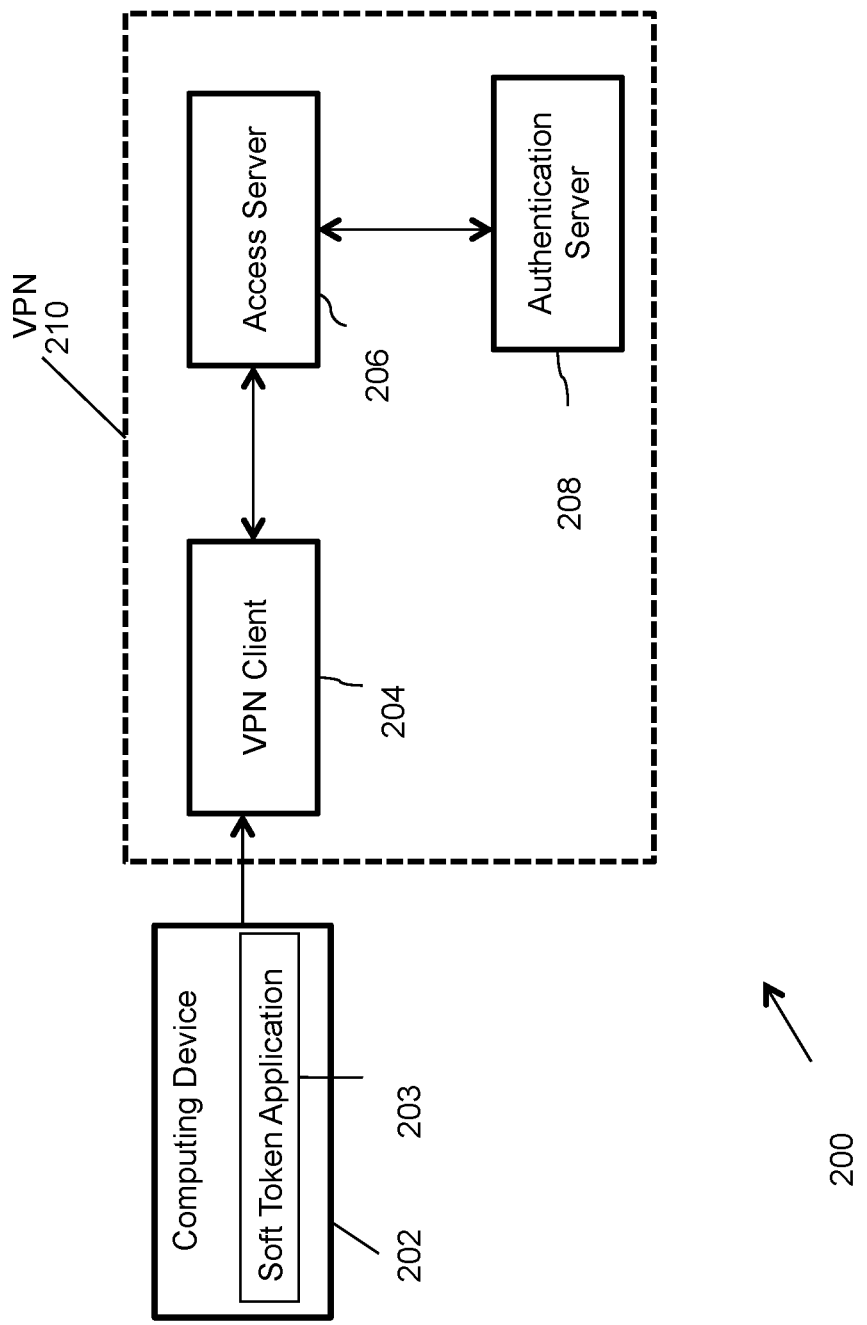
FIG. 2 depicts a system architecture for using a soft token solution to access a Virtual Private Network (VPN) in accordance with an embodiment of the present invention.

FIG. 2 depicts a system architecture 200 for using a soft token solution to access a Virtual Private Network (VPN) 210 in accordance with an embodiment of the present invention. More specifically, FIG. 2 shows an exemplary relationship of a soft token application 203 to the overall authentication system 200.

Typically, VPNs are used by an enterprise to allow authorized employees to securely connect to a corporate network. The remote user that wishes to access the corporate network via VPN 210 has VPN client software installed on their computing device (e.g., a mobile device, a smartphone, a desktop computer, a laptop computer or the like). When connection to the corporate network is attempted, the VPN client software connects the user device to a VPN server using a tunneling protocol. The tunneling protocol further includes various authentication and encryption protocols. After the user device has been successfully authenticated, a secure connection (secret tunnel) between the user device and the VPN server is formed. Then, all subsequent data being transmitted through this tunnel is encrypted at the sending end, for example, the user device and correspondingly decrypted at the receiving end of the tunnel, for example the VPN server.

In accordance with an embodiment of the present invention, a VPN tunnel is facilitated by one or more protocols, including, but not limited to, Point-to-Point Tunneling Protocol (PPTP) and Layer 2 Transfer Protocol L2TP. PPTP uses various authentication protocols such as PPP including as Extensible Authentication Protocol (EAP), Challenge Handshake Authentication Protocol (CHAP), Password Authentication Protocol (PAP), and Shiva. Password Authentication Protocol (SPAP). The authentication protocols are used to authenticate the identity of the remote user. For encryption purposes, protocols used are, for example, EAP or Microsoft Challenge Handshake Authentication Protocol (MS-CHAP).

In accordance with an embodiment of the present invention, the VPN can be used for LAN-to-LAN internetworking, controlled access within an intranet and remote access client connections.

The exemplary authentication system architecture 200 of FIG. 2 includes computing device 202 and VPN 210. The VPN 210 includes a VPN client 204, an access server 206 and an authentication server 208. According to the present example, computing device 202 includes a soft token application 203. Computing device 202 is connected to VPN client 204 (via the Internet, for example), VPN client 204 is further connected to access server 206 and access server 206 is further connected to authentication server 208. In accordance with an embodiment of the present invention, computing device 202, VPN client 204, access server 206 and authentication server 208 are connected/coupled with each other via an enterprise network (not shown). In accordance with an embodiment of the present invention, VPN client 204 may be available in the form of software on computing device 202.

Various examples of computing device 202 may include, but are not limited to, mobile device, smartphone, Personal Digital Assistant (PDA), palmtop, handheld device, tablet, portable device and so forth. Herein, computing device 202 may be used interchangeably with the phrase user device.

In accordance with an embodiment of the present invention, access server 206 is operable to receive credential data from VPN client 204 and provide same to access server 206. Authentication server 208 performs an authentication check to ascertain whether the credentials are correct. Depending upon the particular implementation, functionality of various functional units may be distributed across additional functional units or combined. For example, the functionality of access server 206 can be combined with authentication server 208.

Computing device 202 is used by a user for various purposes, for example, but not limited to, accessing corporate websites, conducting online transactions and the like. In accordance with an embodiment of the present invention, various types of online transactions may include, but are not limited to, online banking, bill payments, funds transfer and so forth.

In accordance with one usage scenario, a user initiates a token application (e.g., soft token application 203) on his/her device (e.g., computing device 202) in connection with generation of an OTP for gaining access to VPN 210. In accordance with an embodiment of the present invention, soft token application 203 has one or more tokens installed within it from which the user selects.

Each of the tokens is unique and may be of varying size. Further, each token has a unique serial number. In accordance with an embodiment of the present invention, a token is generated using an activation code generated by authentication server 208.

In accordance with an embodiment of the present invention, soft token application 203 is stored in the memory of computing device 202. In accordance with various embodiments of the present invention, token serial numbers, secret keys, Personal Identification Numbers (PINs), a unique device ID, OTP values, seeds, activation codes and the like are also stored in the memory of computing device 202.

In accordance with another embodiment of the present invention, a copy of the soft token is also stored on authentication server 208. In accordance with an embodiment of the present invention, soft token application 203 may be protected by a Personal Identification Number (PIN). The PIN can be set by the user at the time of installing soft token application 203 on the user device (e.g., computing device 202).

According to one embodiment, after soft token application 203 is initiated, a unique device ID of computing device 202 is obtained programmatically by soft token application 203 via an Application Programming Interface (API) of the operating system of computing device 202, for example. Further, a cryptographic hash value of the unique device ID may be calculated. The hash value may then be compared with a hash value present within authentication server 208. Based on the comparison, it may be determined whether the selected token is bound to computing device 202. If the token is determined not to be bound to computing device 202, then the OTP generation process halts; otherwise, an OTP value is generated corresponding to the selected token.

In accordance with an embodiment of the present invention, soft token application 203 uses an input, for example, a seed to generate the OTP value.

Each time the user wishes to access VPN 210, for example, an OTP is used along with a static password. To accomplish this successfully, the user logs into VPN client 204 by entering his/her credential details. In accordance with an embodiment of the present invention, such credentials may include, but are not limited to, a user name and a password. Herein, the password is a combination of static password plus the OTP value generated using soft token application 203. The credential data is input by the user in VPN client 204 and then the credential details are passed to access server 206. Thereafter, the details are sent by access server 206 to authentication server 208. In accordance with an embodiment of the present invention, the credential details are also known as authentication data of the user.

In accordance with an embodiment of the present invention, access server 206 and authentication server 208 are communicated using well-known protocols. For example, authentication may be performed by a RADIUS server.

After receiving the credential details, authentication server 208 performs an authentication check to ascertain whether the details input by the user are correct. Based on the check performed, authentication server 208 rejects or accepts the credential details. When the credential details input by the user are correct, authentication server 208 accepts the details; otherwise, authentication server 208 rejects the credential details. Accordingly, authentication server 208 notifies the user. In case of successful authentication, authentication server 208 sets up the VPN connection with VPN client 204, thereby connecting computing device 202 to VPN 210.

Once the VPN connection with computing device 202 is set up, user can access his/her corporate website in accordance with policies established for the user.

In accordance with an embodiment of the present invention, authentication server 208 stores user related information such as user names, corresponding passwords, profile information, preferences, and so forth. In accordance with another embodiment of the present invention, authentication server 208 stores a copy of soft token application 203. In accordance with further embodiments of the present invention, authentication server 208 stores token serial numbers, secret keys, Personal Identification Numbers (PINs), unique device IDs, OTP values, seeds and activation codes.

In accordance with an embodiment of the present invention, VPN client 204 is a client system running a FortiClient client-based software solution available from Fortinet, Inc. of Sunnyvale, Calif. In accordance with an embodiment of the present invention, access server 206 is a security appliance, such as one of the FortiGate family of security appliances available from Fortinet, Inc. of Sunnyvale, Calif. In accordance with an embodiment of the present invention, authentication server 208 is a secure authentication appliance, such as one of the FortiAuthenticator family of secure authentication appliances available from Fortinet, Inc. of Sunnyvale, Calif.

According to embodiments of the invention, the functional units (e.g., VPN client 204, access server 206 and authentication server 208) can be implemented by any suitable type of logic (e.g., digital logic) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

The present invention is not limited to the embodiments disclosed herein. Other variations of the disclosed embodiments can be understood and effected by those skilled in the art in participating the claimed invention, from a study of drawings, the disclosure and the claims.

Figure 3:
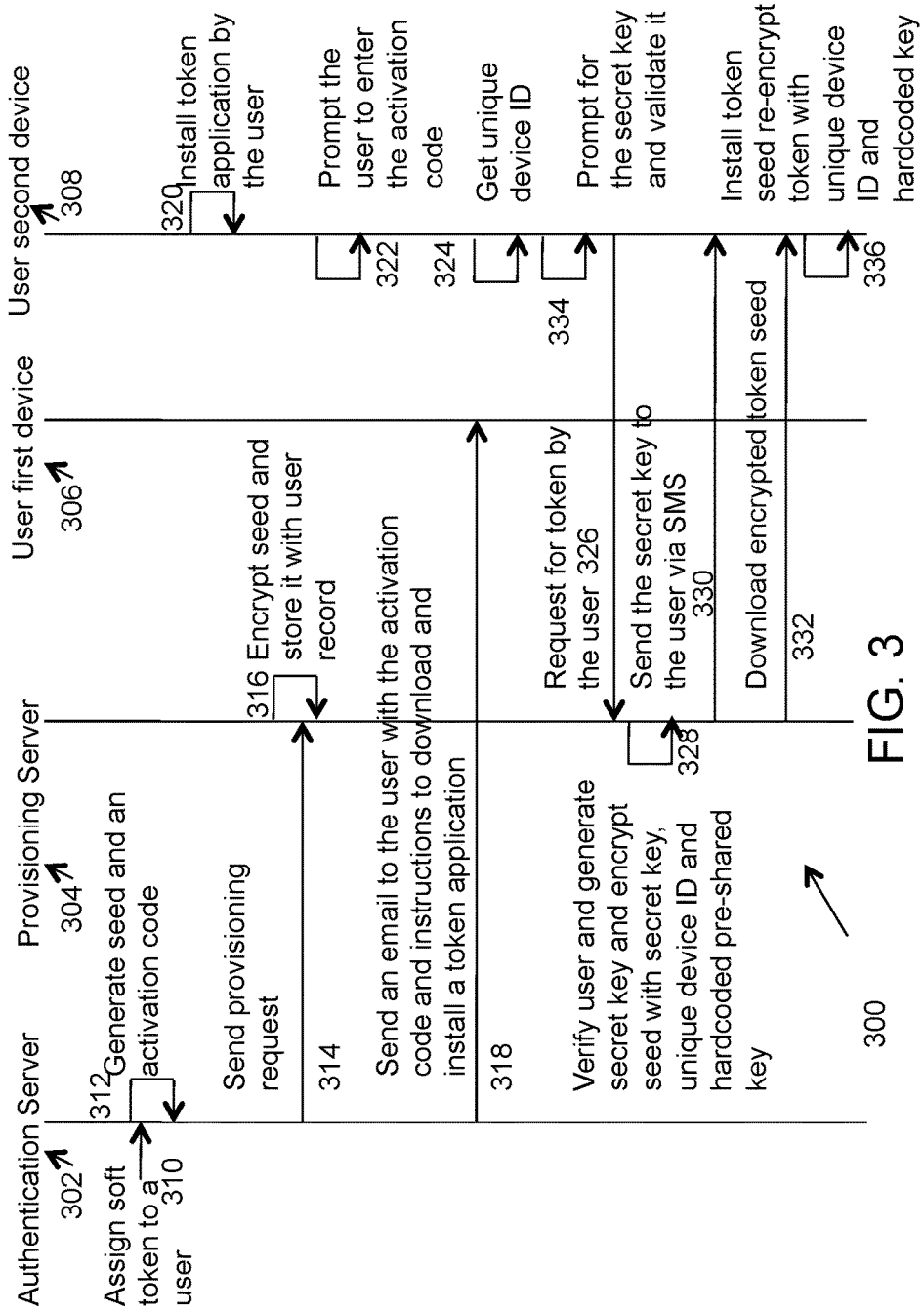
FIG. 3 is a flow diagram illustrating token provisioning processing in accordance with an embodiment of the present invention.

FIG. 3 is a flowchart 300 for token provisioning in a network, in accordance with an embodiment of the present invention. In the context of the present example, the primary aim is to create/initiate a token associated with the soft token application and then the token is used to generate a One Time Password (OTP). According to this figure, the process of provisioning the token is simplified by creating an activation code based on a centrally managed serial number source. Managing serial number at central location enhances uniqueness of the serial number. In one embodiment, the activation code is generated using random number generation and in most of the cases it also serves as basis for token serial number generation. The tokens are provisioned dynamically.

In accordance with an embodiment of the present invention, a soft token is also referred to as a software token and these phrases can be used interchangeably. Typically, a soft token application has two components including soft token application code and a seed record. The application code implements a One Time Password (OTP) function and the seed record in the application is used to generate the OTP function's value.

In accordance with an embodiment of the present invention, a device display and associated keypad/keyboards are also considered while designing a User Interface (UI) for the token application to be installed on the user device.

In accordance with an embodiment of the present invention, the device ID of the user device is detected automatically. Accordingly, appropriate token application is built with a provisioning server 304 for that user device.

In accordance with an embodiment of the present invention, the token application can be customized on a per user or a group basis by injecting specific data into the token application.

In accordance with an embodiment of the present invention, a request sent by the user, such as an HTTP request, can be used to detect the device specifics and accordingly download the correct application version to the user device. Then, the custom configuration parameters are sent to the user device. Subsequently, the token application, as per the device specifics, is downloaded onto the user device. According to one embodiment, provisioning server 304 may auto-detect the type of device (based on the HTTP-USER-AGENT field of the HTTP request, for example) and serve an appropriate token application build to the user's second device 308 (e.g., a mobile device).

To start, an administrator assigns a soft token to a user at 310. In accordance with an embodiment of the present invention, the token is assigned to the user by an authentication server 302. After this, at 312, a unique seed and a unique activation code corresponding to the token are generated. In accordance with an embodiment of the present invention, the unique seed and the unique activation code are generated by the authentication server 302. Then, a provisioning request along with the unique seed, the unique activation code, user information, such as a user ID, and a mobile number are sent at 314. Then, at 316, the seed is encrypted and further stored as a part of a user record. In accordance with an embodiment of the present invention, the information is sent from the authentication server 302 to the provisioning server 304 over a mutually authenticated encrypted tunnel, such as a VPN.

In accordance with an embodiment of the present invention, the seed is an encoded random key used to generate an OTP. Further, the seed may vary for each token. Further, the token application and the authentication server 302 share a seed. The token application applies an algorithm to the seed to generate an OTP value.

In accordance with an embodiment of the present invention, the activation code is sent to the user via an out-of-band mode, including, but not limited to, SMS, email, snail mail and a phone call. The user then inputs the activation code to verify whether he or she is the right owner of the token seed to be installed within the token application. Further, the activation code may be used to generate the token serial number installed within the token application.

After this, the activation code and instructions to download a token application may be sent to the user via email at 318, on a user first device 306. In accordance with another embodiment of the present invention, the activation code and instructions to download the token application can be sent to the user via SMS. After receiving the activation code and instructions regarding downloading and installing the token application, at 320, the user installs the soft token application on his/her second device 308 (the device to be used for OTP generation). Various examples of the user device have been discussed above in detail. Thereafter, the soft token application prompts the user, at 322, to enter the activation code previously sent to the user. Then, a check is performed to determine whether the activation code entered by the user is correct or not. In case the activation is not correct, then the user is prompted again to enter the correct activation code. In one embodiment, if the activation code input by the user is correct, then, at 324, the unique device ID of the device is programmatically obtained by the soft token application through an API of an operating system of the device at issue.

As will be appreciated by those of ordinary skill in the art, various options exist for the unique device ID. In accordance with an exemplary embodiment of the present invention, when the user's second device 308 is an Apple iPhone, then the Unique Device Identifier (UDID) may serve as the device's unique device ID. Alternatively, the International Mobile Equipment Identity (IMEI) of GSM phones may be used as the unique device ID. As yet another alternative, the Mobile Equipment Identifier (MEI) for CDMA phones may be used as the unique device ID.

After the token application identifies the unique device ID, the ID is sent along with the activation code with a request to download the token at 326. In accordance with an embodiment of the present invention, the unique device ID and the activation code are sent to the provisioning server 304. Thereafter, the authenticity of the user is verified based on the activation code. Post verification, a secret key is generated and then the token seed is encrypted with the secret key, the unique device ID and the hardcoded pre-shared key at 328. In accordance with an embodiment of the present invention, the secret key is specific for each user. In one embodiment, the secret key size is at least 20 bytes for use in connection with a HMAC-SHA-1 time-based OTP generation implementation. In one embodiment, the secret key size is at least 32 bytes for use in connection with a HMAC-SHA-256 time-based OTP generation implementation.

After encrypting, at 330, the encrypted token seed along with the secret key may be sent to the user via two separate communication channels to different user devices. For example, the secret key may be sent to the second device 308 via SMS (thereby binding delivery of the seed to the device by way of its mobile number) and the encrypted token seed and a cryptographic hash of the unique device ID may be separately downloaded by The soft token application. Then, at 334, the soft token application prompts the user for the secret key and the key is validated. Also, one more check is performed to determine whether a cryptographic hash of the locally obtained unique device ID matches with the downloaded cryptographic hash value. Subsequently, at 336, the token seed is installed after decrypting. Then, the token seed is re-encrypted with the unique device ID, the secret key and the hardcoded key and is then stored on the user device. In this manner the token is bound to the device as one part of the encryption key is the unique device ID.

In accordance with an embodiment of the present invention, the soft token application forms the decryption key from the secret key, the unique device ID, hardcoded pre-shared key.

In accordance with an embodiment of the present invention, the seed is encrypted while in transit. Further, the activation code and the seed may be delivered to the user via two separate channels (SMS and email); thus protecting against delivery to an unintended party by way of two separate authentication steps relating to the user.

In accordance with an embodiment of the present invention, use of SMS also binds the delivery of the seed to the device.

In accordance with an embodiment of the present invention, the soft token is bound to the user (target) device via the unique device ID. In this manner, a copy of the token bound to the target device cannot be used successfully in the context of another device. In accordance with another embodiment of the present invention, the token is simply rendered useless when copied to any other device as the unique device ID programmatically retrieved from the new device cannot be used to successfully decrypt the token.

In accordance with an embodiment of the present invention, each time the token is used for performing an online activity, binding of the token to the device is checked.

In accordance with an embodiment of the present invention, a fingerprint of the user device can be generated and then associated with the soft token.

In accordance with an embodiment of the present invention a cryptographic hash of the unique device ID is sent to server and later compared with the ID stored on the device.

In accordance with an embodiment of the present invention, each token has an associated serial number that can be displayed on the user device. The serial number as generated is as per the OATH requirements. In accordance with an embodiment of the present invention, the token is created based on the activation code.

In accordance with an embodiment of the present invention, any type of OTP as known in the art can be generated by the token application. According to the embodiment, various examples of OTP include, but not limited to, time synchronous OTP, event synchronous OTP and challenge response based OTP. For each type of OTP, an algorithm is applied to the seed to generate an OTP. In time synchronous OTP, the algorithm uses a combination of time and the seed to generate a new OTP at each time interval (e.g., 30 to 60 seconds). In event synchronous OTP, an OTP is generated based upon an event/activity performed by a user such as pressing a button. In challenge response OTP, initially a challenge is entered or sent to the token application. Then, the challenge is combined with the seed to generate a response, typically known as OTP. Moreover, there exists multiple pre-defined algorithms for generating OTP; the algorithms can be used either alone or in hybrid combinations.

In accordance with an embodiment of the present invention, the soft token solution can be implemented including, but not limited to, desktops, laptops, browser toolbars, blackberry smart phone, iPhone, windows mobile phone, java based smart phone, Symbian OS, and mobile devices.

In accordance with an embodiment of the present invention, the OTP duration may be set of predefined time limit, for example in the range of 30 to 60 seconds.

In accordance with an embodiment of the present invention, the OTP length may be predefined, such as 6 digits or 8 digits.

In accordance with an embodiment of the present invention, various encryption/decryption algorithms as known in art can be used. Various examples of algorithms may include, but not limited to, symmetric, asymmetric, public key and private key algorithms. To elaborate this in detail, various encryption/decryption algorithms may include, but not limited to, Hash, Advanced Encryption Standard (AES), Blowfish, CAST5, Digital Encryption Standard (DES), IDEA, RC2, RC4, RC6, Serpent, Triple DES, Twofish, RSA, Diffie-Hellman, and Digital Signature Algorithm.

In accordance with various embodiments of the present invention, one or more aspects of the token application and its associated components will be discussed below in detail.

Token Application

In accordance with an embodiment of the present invention, the token application allows a predefined number of tokens to be provisioned per soft token application instance. In accordance with an embodiment of the present invention, the tokens to be provisioned depend upon the storage capacity of the device. In accordance with an exemplary embodiment of the present invention, each token application instance is associated with a predefined number of tokens, for example, 12.

The token application uses the same cryptographic hash algorithm as the provisioning/authentication server to compare the unique device ID sent from the provisioning/authentication server to the unique device ID obtained locally from the device.

In accordance with an embodiment of the present invention, the token application includes a pre-shared key, shared with the provisioning/authentication server that will be used for cryptographic operations.

Platforms:

In accordance with an embodiment of the present invention, the token application installed on the user device is compatible with various versions of device. Examples of such versions may include, but not limited to, Apple iPhone, Android versions, Blackberry, Windows 7, Symbian versions, Palm, Apple iPAD, tablets, and the like.

Installation:

In accordance with an embodiment of the present invention, the token application can be made available for download from the iTunes store for iPhone and iPAD installations. In accordance with another embodiment of the present invention, the token application can be downloaded from the Android market store for Android versions. In accordance with further embodiment of the present invention, the token application can be downloaded from the provisioning server for other types of user devices.

In accordance with an embodiment of the present invention, the token application is native built for each type of user devices installation like Windows Mobile, Blackberry, Apple iPhone, Symbian, Android and Palm.

Token ID:

In accordance with an embodiment of the present invention, each token is assigned with a unique token ID or serial number. The assigned token ID or the serial number is available with the token application installed on the user device. The token ID is generated based on the activation code.

When a token is selected for use, the token application gets the unique device ID from the device and the hardcoded key to decrypt the token seed.

OTP Algorithms:

In accordance with an embodiment of the present invention, the token seed is stored on both the token application and the authentication server.

In accordance with an embodiment of the present invention, time-based OTP values can be generated by the token application. The OTP function of the token application conforms to OATH TOTP profiles. Since tokens seeds are generated and stored on authentication server in an encrypted form, thereby protecting the soft token to be used with third party products without the permission.

In accordance with an embodiment of the present invention, the time-based OTP value as calculated is based on the TOTP algorithm, where TOTP is a function of HOTP (K, T). Herein T is a time-based integer and K is a symmetric shared secret.

According to the above embodiment, the time-based integer (T) is calculated as the number of time steps (X) from T0 (UNIX epoch) to the current (UNIX epoch) time. For example, the length of the time step X may be 30 seconds. Further, the default floor function is used in the computation of T. For example, with T0=0 and time step X=30, T=1 if the current UNIX time is 59 seconds and T=2 if the current UNIX time is 60 seconds.

In accordance with an embodiment of the present invention, the token application generates an OTP that is visible in a user interface of the soft token application. Depending upon the particular implementation, the OTPs generated by the soft token application may be capable of being sent or otherwise copied to the clipboard to facilitate use by the user.

Secret Key:

In accordance with an embodiment of the preset invention, the secret key K is unique for each token. Algorithms like Hash-based Message Authentication Code Secure Hash algorithm (HMAC-SHA-1) OR HMAC-SHA-256 are used for the computation of the secret key.

In accordance with an embodiment of the present invention, the secret key size is of predefined size, for example, at least 20 bytes if HMAC-SHA-1 is used for computation. In another example, the secret key size is of at least 32 bytes if HMAC-SHA-256 is used for the computation.

Functions

In accordance with an embodiment of the present invention, the token application has a function to retrieve a new token. In accordance with this embodiment, the new token can be retrieved from the provisioning server. Each instance of provisioned token is defined by creation of a unique seed. Therefore each instance of token on the device corresponds to the successful receipt and installation of the seed for that token.

In accordance with an embodiment of the present invention, the token application has a function to get the unique device ID from the user device. The token application sends the unique device ID along with the request to retrieve new token.

If the unique device ID used to encrypt the new token seed does not match the unique device ID of the device present over the network, the new token installation fails and an error message is displayed on the token application on the user device.

If the unique device ID used to encrypt the new token seed matches with the unique device ID of the device stored over the network, the application decrypts the new token seed using the key formed by a combination of secret key, unique device ID, and hardcoded key and re-encrypt using the same combination before storing on the device.

In accordance with an embodiment of the present invention, the token application has a function to delete tokens. Accordingly, the "Delete Token" function removes all seed material for that token and all references to that token serial name. In case no tokens are installed within the token application, then the token application automatically invokes the function to request new tokens from the provisioning server.

Token Application Management

In accordance with an embodiment of the present invention, the token application provides a "Help Screen". If Help is selected, the application redirects to the token application online help URL.

In accordance with an embodiment of the present invention, the token application User Interface (UI) further includes an "About" section that will display device platform information, application version running on the user device, token IDs for the installed tokens and so forth.

Performance

In accordance with an embodiment of the present invention, the token application is loaded on user device and is ready for use within a very short predefined time, for example, 100 milliseconds of launching. Further, in one embodiment, the token application displays a requested OTP within 100 ms of the corresponding request. Moreover, the token application presents UI screen changes within 100 ms of corresponding requests (e.g., user button press actions).

User Interface (UI) Functionality

In accordance with an embodiment of the present invention, when user starts the token application on user device, a screen with token selection option is displayed to the user. The screen displays the names of all the tokens installed on the token application. Accordingly, the user can select a desired token of the tokens installed in the token application. When a token is selected via the "Select Token Screen" of the UI, the corresponding OTP value generated may be displayed or otherwise be made available for use (e.g., by being copied to the clipboard).

In accordance with an embodiment of the present invention, the user is prompted to enter an activation code when a new token is being installed on the token application.

In accordance with an embodiment of the present invention, at the time of installation of token application, a screen to set a PIN is displayed to the user. The token application is protected using the optional PIN. If the PIN is set, access to all tokens in the token application are protected by that PIN. In accordance with an embodiment of the present invention, the PIN is of predefined length, such as, 4 characters. In accordance with another embodiment of the present invention, the length of PIN can be up to 12 characters.

In accordance with an embodiment of the present invention, the token application includes a flag to indicate to the application whether the PIN protection is being enforced.

In accordance with an embodiment of the present invention, PIN policy flag is set in the application if the provisioning server indicates that PIN Protection is being enforced.

In accordance with an embodiment of the present invention, if the PIN policy flag is not set, the token application UI allows installation whether or not a valid PIN is created.

In accordance with another embodiment of the present invention, if the PIN policy flag is set, the token application UI indicates completion of the installation of the application only when a valid PIN is created by the user. Accordingly, the user is prompted to enter a valid PIN. In accordance with this embodiment of the present invention, each time when the user initiates the token application, he or she is prompted to enter a valid PIN.

In accordance with an embodiment of the present invention, the token application provides a screen to select "Change PIN". If the user selects "Change PIN", then the UI prompts the user to enter the current PIN and then new PIN with confirmation of new PIN. If the current PIN entered above is not correct, the Change PIN action gets failed and then the user is prompted again. In the similar manner, if the "New PIN" entered by the user does not match the confirmation, the "Change PIN" action is not completed. As a next step, the user is prompted to enter the PIN again.

In accordance with an embodiment of the present invention, the token application provides a screen to select "Retrieve New Token". If the user selects "Retrieve New Token", the application UI presents a message as to whether the action succeeded or failed. If the user selects "Retrieve New Token", and a new token is retrieved, the application UI prompts the user to enter the activation code before completing the token installation.

In accordance with an embodiment of the present invention, the token application provides a screen to "Delete Existing Token". If the user selects "Delete Existing Token", then the application presents a list of all available tokens to the user. If the user selects one of the tokens on the list above, then the application asks confirmation for the token to be deleted. If the user confirms deletion of the token, then the application invokes the feature to delete the token completely from the application.

In accordance with an embodiment of the present invention, the token application UI provides a screen to "Display Time". If "Display Time" is selected, the application UI presents the current epoch time value.

Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 4A:
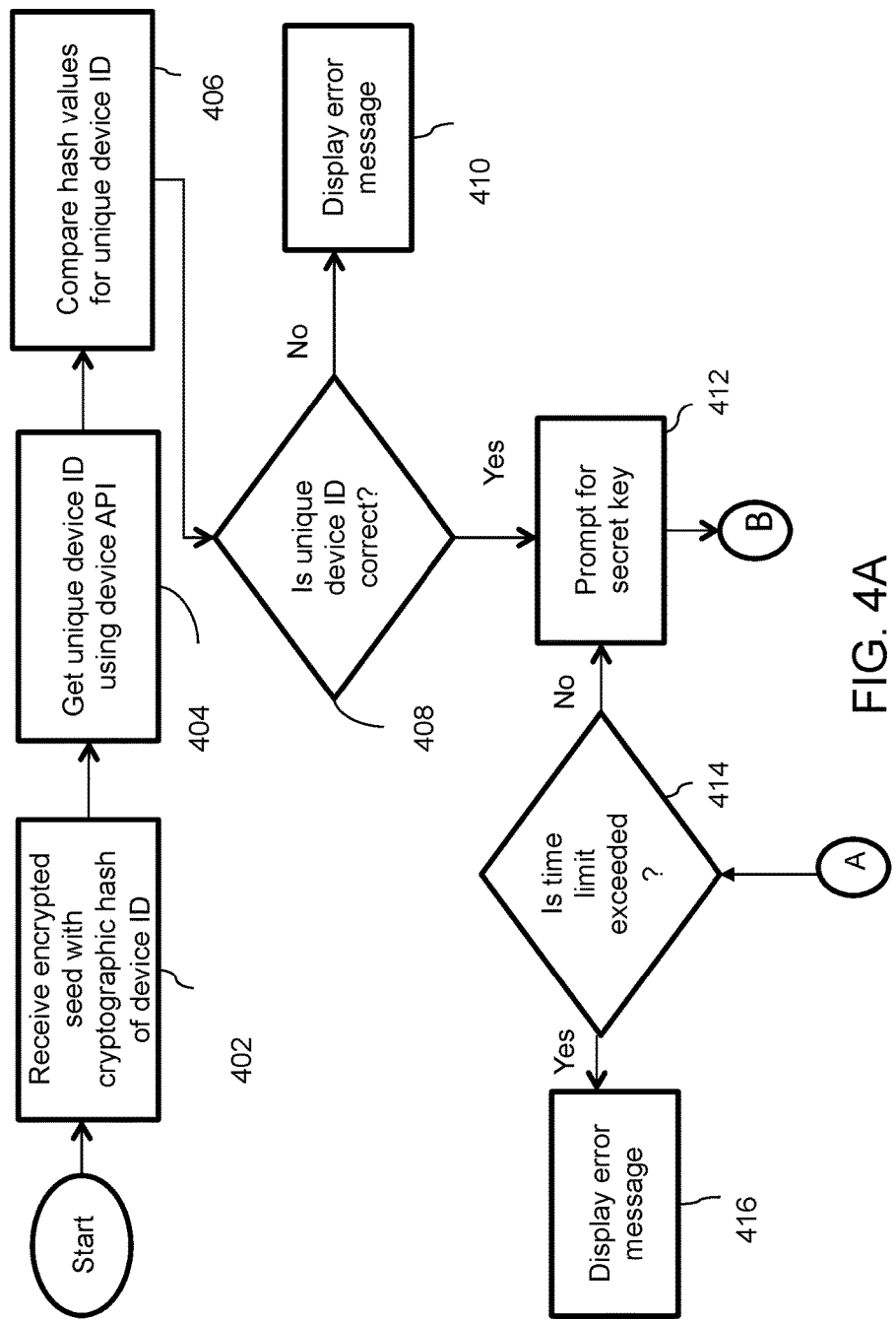
FIGS. 4A and 4B collectively represent a flow diagram illustrating a process for binding a token to a user device in accordance with an embodiment of the present invention.
Figure 4B:
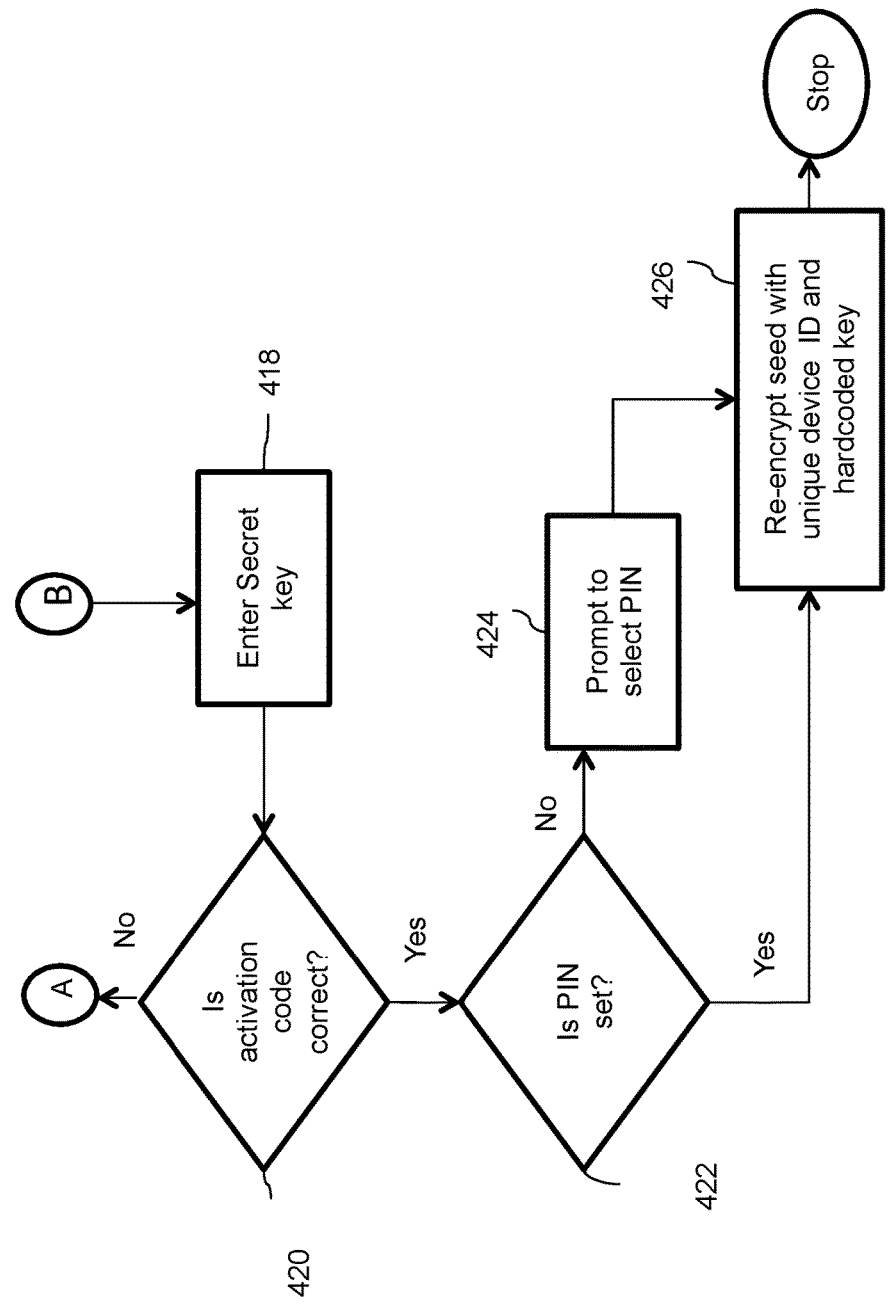

FIGS. 4A and 4B represent a method for binding a token to a user device, in accordance with an embodiment of the present invention. In particular, the method focuses on binding of the token to the user device while installing token application on the user device.

Initially, an encrypted seed with cryptographic hash of user device ID is received at block 402. In one embodiment, the encrypted seed and the cryptographic hash are downloaded from a provisioning server (e.g., provisioning server 304) by the soft token application.

At block 404, the unique device ID of the user device is obtained. According to one embodiment this is a programmatic step that takes place by the soft token application making a call to an operating system API of the user device. Once the user device ID is obtained, hash values for unique device ID are compared at block 406. Thereafter, a check is performed to ascertain whether the unique device ID is correct at 408. If the device ID is not correct, an error message is displayed at block 410. If the device ID is correct, the user is prompted to enter a secret key at 412. Then, the user enters the secret key at 418.

After the secret key as input by the user, the user inputs an activation code at decision block 420, and the activation code is checked. If the activation code is correct, then processing continues with decision block 422; otherwise processing branches to decision block 414.

At decision block 422, having already determined the activation code is correct, a determination is made regarding whether a PIN has been set. If the PIN has previously been set by the user and is correctly entered by the user, then re-encryption of the seed with unique device ID, secret key and the hardcoded key is performed at block 426.

If a PIN has not previously been set, the user may be prompted to do so at block 424. Thereafter, at block 426, re-encryption of seed is performed as mentioned above. Continuing with above, in case the activation code as input the user is not correct, then it is checked whether the predefined limit to enter the activation code has been exceeded at decision block 414. If the time limit has been exceeded, an error message is displayed at block 416; otherwise, the user is prompted again to enter the secret key at block 412 and the method continues as discussed above.

Figure 5:
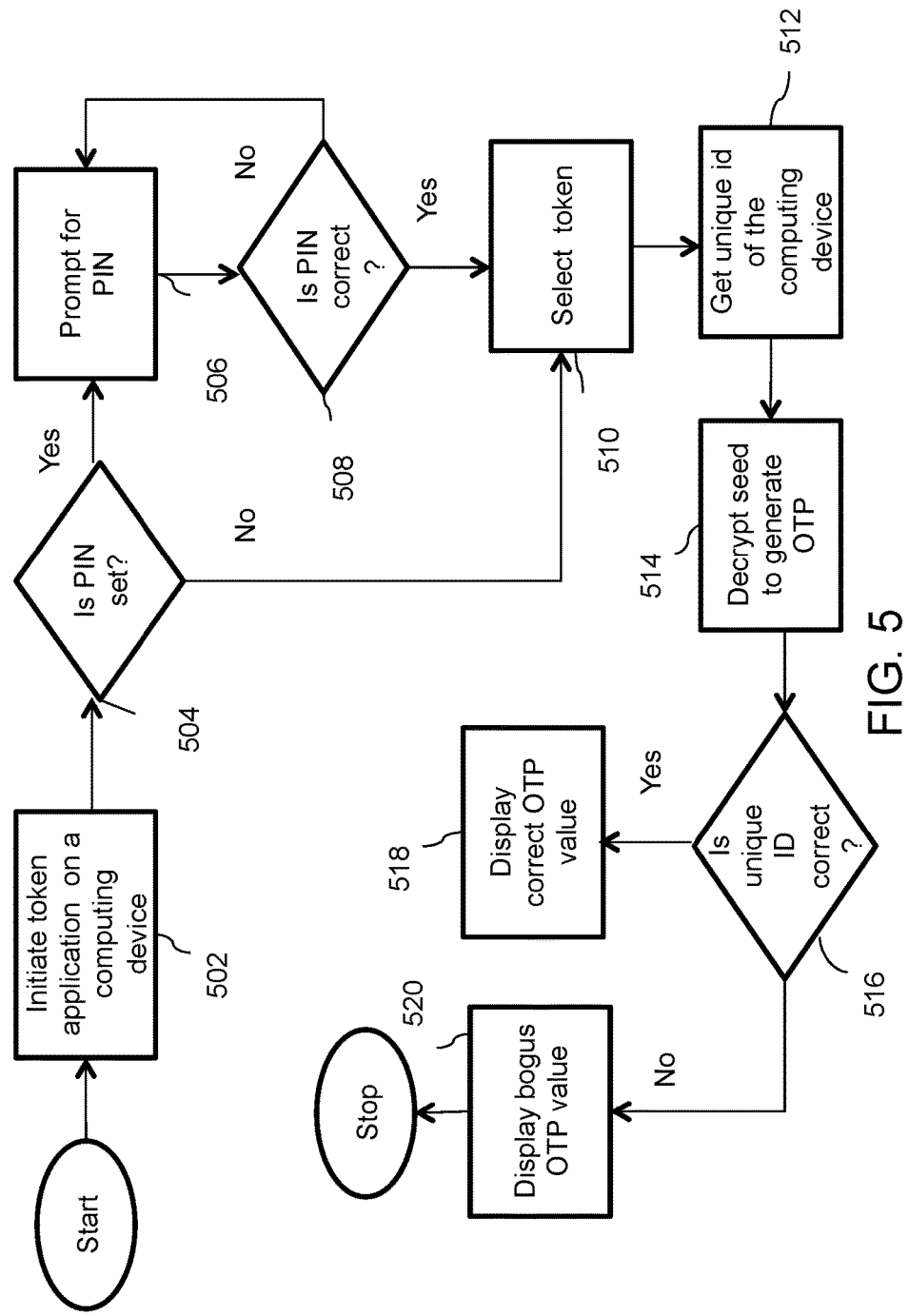
FIG. 5 is a flow diagram illustrating a process for checking the binding of a token to a user device in accordance with an embodiment of the present invention.

FIG. 5 shows a flowchart for checking binding of the token to the user device, in accordance with an embodiment of the present invention. More specifically, in the context of the present example, the flowchart of FIG. 5 is to check binding of the token to the user device when token application is initiated by the user on his/her device.

The primary aim of FIG. 5 is to bind a token to user's device so that the OTP generated by the token cannot be used by an unauthorized party. To start, at block 502, the token application is initiated on a computing device by a user. After this, at decision block 504, it is determined whether a PIN has been set. A PIN may be optionally set by the user to use the token application to provide more security. If a PIN has not been set by the user, the method moves to block 510. If a PIN has been set, then the user is prompted to enter the PIN at block 506. Thereafter, the user inputs the PIN and the correctness of the entered PIN is checked at decision block 508.

If the PIN is correct, then the user is allowed to select a token at block 510. Subsequently, the user selects a token. However, if the PIN input by the user is not correct, then the user is prompted again to enter the PIN at block 506. In accordance with an embodiment of the present invention, the user may be allowed to make a predefined number of PIN entry retries. For example, a user may be allowed to enter the PIN a maximum of 3 times in case of failure and thereafter may be locked out of the soft token application for a predetermined period of time.

Continuing with block 512, a unique device ID associated with the device upon which the soft token application is installed is obtained. According to one embodiment, this is an automated process performed by the soft token application via an API provided by an operating system of the device. Once the unique device ID is obtained, the locally stored seed is decrypted for use in connection with generating a unique OTP value at block 514. Thereafter, a check is performed at decision block 516 to ascertain whether the unique device ID obtained in block 512 is correct. According to one embodiment, the unique device ID locally obtained by the soft token application is specifically matched with the unique device ID stored on the authentication server. If the unique device IDs match, then a correct OTP value is displayed to the user at block 518, which can then be used by the user to successfully perform desired access activities, such as accessing a corporate website, conducting online transactions, accessing emails and the like.

If, however, the unique device ID does not match with the device ID stored on the authentication server, then a bogus OTP value may be displayed to the user at block 520. The bogus value is an incorrect value. In case the user tries to perform one of the activities using the bogus value, the transaction will not be carried out successfully.

Figure 6:
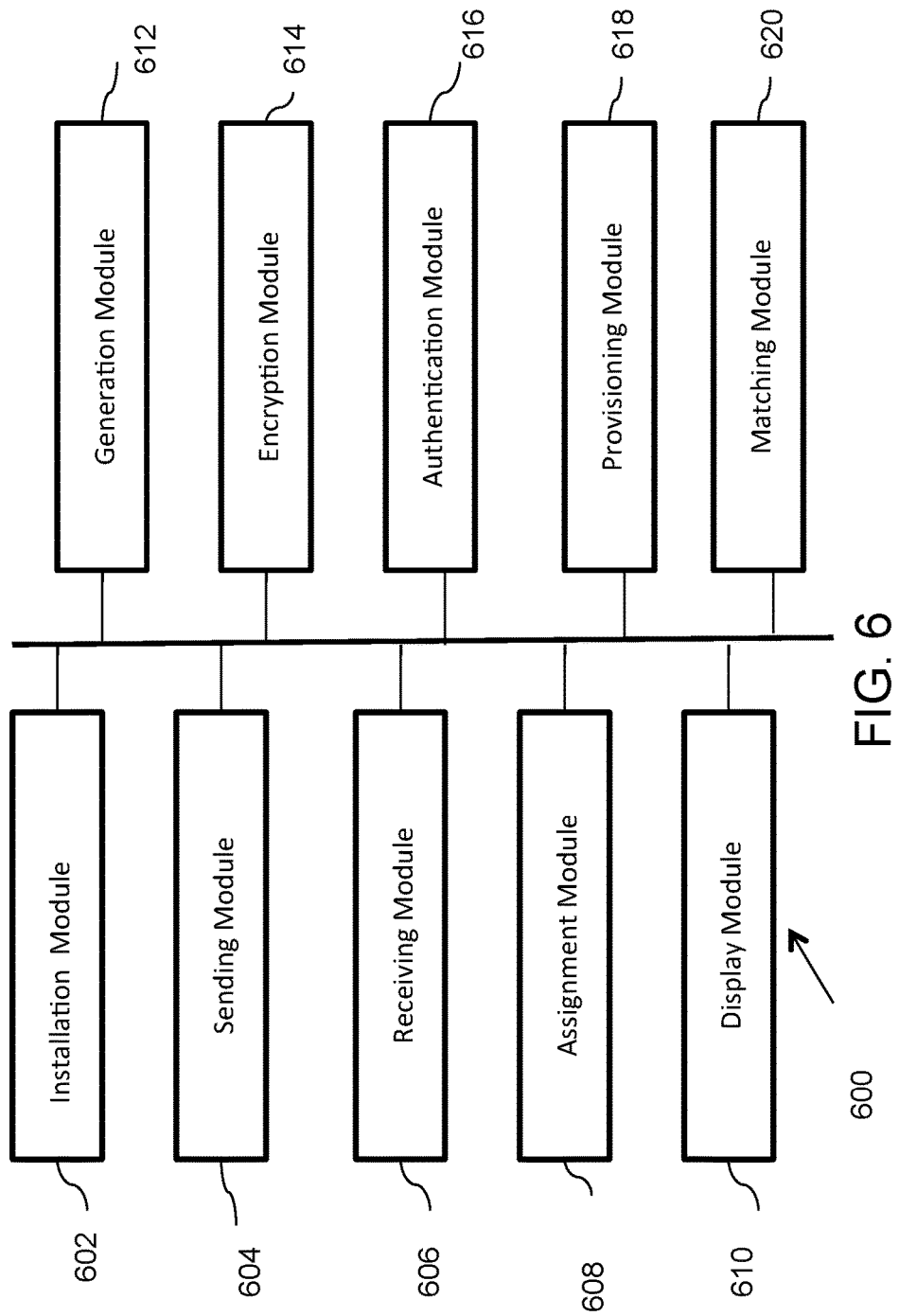
FIG. 6 is a block diagram conceptually illustrating the interaction among various functional units of a secure token system in accordance with an embodiment of the present invention.

FIG. 6 shows various modules for providing a soft token solution 600 in accordance with an embodiment of the present invention. In the present example, particular, soft token solution includes an installation module 602, a sending module 604, a receiving module 606, an assignment module 608, a display module 610, a generation module 612, an encryption module 614, an authentication module 616, a provisioning module 618 and a matching module 620. The above-listed modules may form a part of the end user or the network end, without limiting the scope of the invention.

The installation module 602 allows the user to install the soft token application on the user device, a computer, a mobile device and so on. The token application may be configured to have multiple tokens installed therein. Further, the sending module 604 is capable of sending information over the network including the unique device ID, the user ID, the seed, the activation code etc. The sending module 604 sends a request along with the activation code and the device ID. Similarly, the receiving module 606 receives the information either from the network or from the user device.

The assignment module 608 assigns soft token for the token application installed on the user device. The display module 610 displays various information such as token, serial number associated with the token, seed value, Sometimes, the error messages related to the token application are displayed through the display module 610. The display module 610 is also capable of displaying the OTP value.

Furthermore, the generation module 612 generates OTP using seed, for securing VPN. For each token, a unique OTP is generated. The generation module 12 is also capable of generating seed value, activation code and information required to generate the OTP. The encryption module 614 encrypts the seed using the secret key, device ID and the like. The authentication module 616 authenticates the users for one or more tokens installed on the user device. Also, the authentication module 616 stores soft token. The provisioning module 618 initiates one or more tokens for the user device. When required, the provisioning module 618 communicates with an authentication module 616. Additionally, the matching module 620 determines whether the device ID as obtained matches with the device ID stored over a network. Also, the matching module 620 checks whether the PIN input by the user is correct.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Embodiments of the present invention provide methods and systems to facilitate a secure soft token solution for various platforms and further have numerous advantages. The soft token application can be customized as per requirements. The soft token application can have multiple tokens, each token being used to generate a different OTP. Embodiments of the present invention further enhance security while performing one or more activities by a user. Embodiments of the present invention further facilitate an automated approach of detecting the type of device being employed by the user, thereby making the process of downloading the proper version of the soft token application more efficient. Additionally, embodiments of the present invention bind tokens to the user's device thereby producing invalid OTP values if the tokens are copied to another device. Furthermore, embodiments of the present invention provide out-of-band authentication of users. Moreover, depending upon the particular implementation, the token application may be capable of managing tokens of varying size. In addition, embodiments of the present invention secure the seed by encrypting the seed while it is in transit. A further security advantage of embodiments of the present invention involves the separate delivery of the secret key and the encrypted token seed to the user via different channels.

Figure 7:
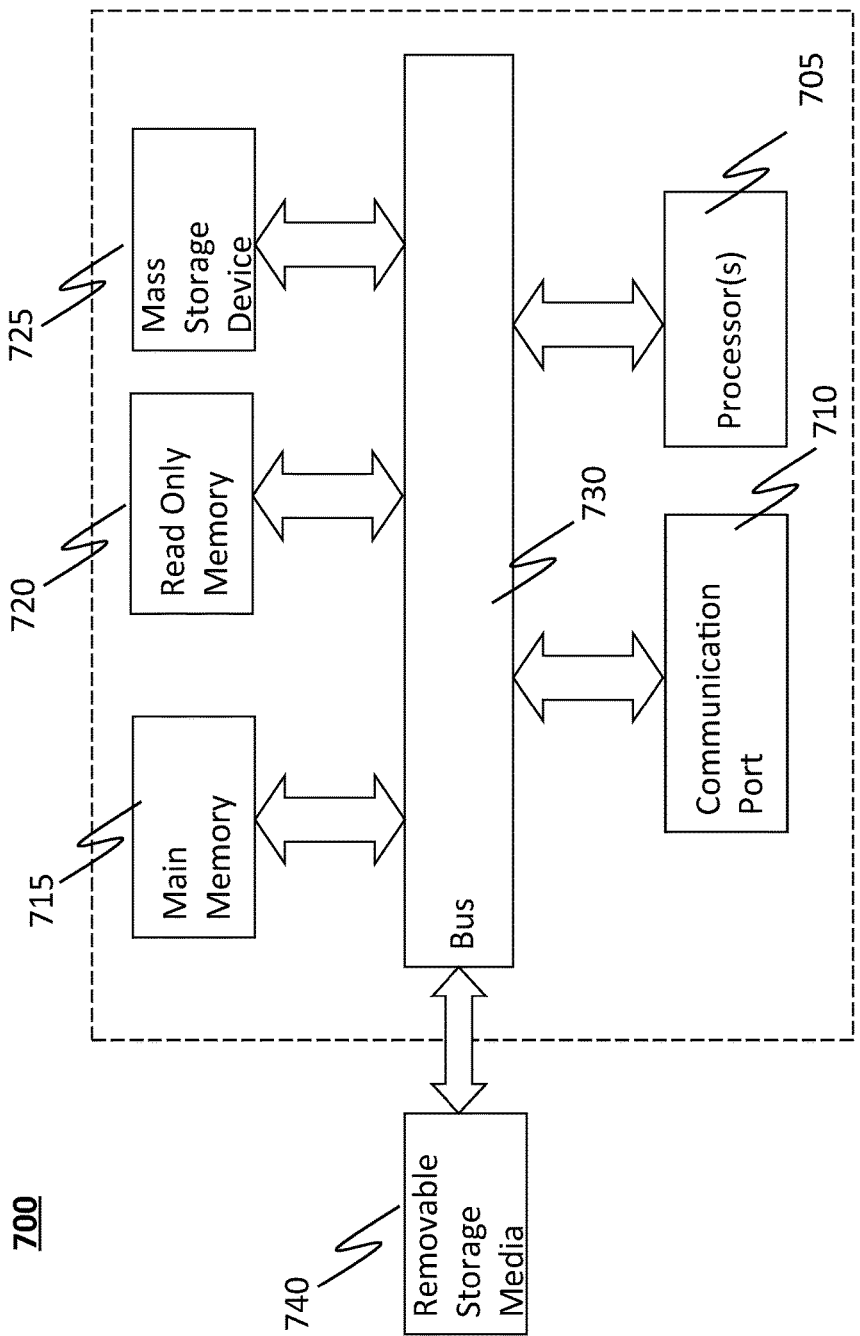
FIG. 7 is an example of a computer system with which embodiments of the present invention may be utilized.

FIG. 7 is an exemplary computer system in which or with which embodiments of the present invention may be utilized. Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 7 is an example of a computer system 700, such as computing device 203 (e.g., a workstation, a desktop computer, a mobile device, a smartphone, a laptop, a notebook computer, a tablet computer, a netbook, a Personal Computer (PC), an iPhone, an iPad, a palmtop computer or the like), VPN client 204, access server 206 and/or authentication server 208, upon which or with which embodiments of the present invention may be employed.

According to the present example, the computer system includes a bus 730, one or more processors 705, one or more communication ports 710, a main memory 715, a removable storage media 740, a read only memory 720 and a mass storage 725.

Processor(s) 705 can be any future or existing processor, including, but not limited to, an Intel® Itanium® or Itanium 2 processor(s), or AMD® Opteron® or Athlon MP® processor(s), or Motorola® lines of processors. Communication port(s) 710 can be any of an RS-232 port for use with a modem based dialup connection, a 10/100 Ethernet port, a Gigabit port using copper or fiber or other existing or future ports. Communication port(s) 710 may be chosen depending on a network, such a Local Area Network (LAN), Wide Area Network (WAN), or any network to which the computer system 700 connects.

Main memory 715 can be Random Access Memory (RAM), or any other dynamic storage device(s) commonly known in the art. Read only memory 720 can be any static storage device(s) such as Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication ports 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the invention.

What is claimed is:
1. A method comprising:
 prompting, by a soft token application installed on a mobile device, a user of the mobile device to input an activation code previously provided to the user by an authentication server, wherein the authentication server authenticates credentials provided by users of a secure network resource that is accessible via an Internet Protocol (IP)-based network;

programmatically obtaining, by the soft token application, a unique device ID of the mobile device via an Application Programming Interface (API) of an operating system of the mobile device, wherein the unique device ID uniquely identifies the mobile device;

requesting, by the soft token application via the IP-based network, a token seed from a provisioning server associated with the soft token application by sending a request containing (i) a cryptographic hash of the unique device ID or the unique device ID and (ii) the activation code to the provisioning server, wherein the token seed is for use in connection with generating a token for obtaining access to the secure network resource;

receiving, by the soft token application, the token seed in encrypted form, wherein an encryption key used to generate the encrypted form is based on a combination of a secret key, the unique device ID and a hardcoded-pre-shared key;

binding in a persistent manner, by the soft token application, the token seed to the mobile device by encrypting the token seed based on the unique device ID; and when the token is requested by the user, generating, by the soft token application, the token based on the bound token seed.

2. The method of claim 1, wherein said generating, by the soft token application, the token based on the bound token seed comprises:

programmatically obtaining, by the soft token application, the unique device ID via the API;

obtaining the token seed from the bound token seed by decrypting, by the soft token application, the bound token seed based on the unique device ID; and invoking, by the soft token application, a token generation function with the token seed as an input to the token generation function.

3. The method of claim 1, further comprising providing, by the provisioning server, automated download assistance of a proper version of the soft token application.

4. The method of claim 1, wherein the mobile device comprises a smartphone and wherein the unique device ID comprises a Unique Device Identifier (UDID), an International Mobile Equipment Identity (IMEI) or a Mobile Equipment Identifier (MEI).

5. The method of claim 1, wherein the activation code is received by the mobile device from the authentication server via a first out-of-band channel.

6. The method of claim 5, wherein the first out-of-band channel comprises electronic mail (email).

7. The method of claim 5, further comprising:

receiving, by the user from the provisioning server via a second out-of-band channel, the secret key;

prior to said requesting, by the soft token application via an IP-based network, a token seed from a provisioning server, prompting the user, by the soft token application, for the secret key.

8. The method of claim 7, wherein the second out-of-band channel comprises Short Message Service (SMS).

9. The method of claim 1, wherein the token comprises a One-Time Password (OTP).

10. The method of claim 9, wherein the OTP comprises a time-based OTP.

11. A non-transitory computer-readable storage medium embodying a set of instructions representing a soft token application, which when executed by one or more processors of a mobile device, cause the one or more processors to perform a method comprising:

prompting a user of the mobile device to input an activation code previously provided to the user by an authentication server, wherein the authentication server authenticates credentials provided by users of a secure network resource that is accessible via an Internet Protocol (IP)-based network;

programmatically obtaining a unique device ID of the mobile device via an Application Programming Interface (API) of an operating system of the mobile device, wherein the unique device ID uniquely identifies the mobile device;

requesting via the IP-based network a token seed from a provisioning server associated with the soft token application by sending a request containing (i) a cryptographic hash of the unique device ID or the unique device ID and (ii) the activation code to the provisioning server, wherein the token seed is for use in connection with generating a token for obtaining access to the secure network resource;

receiving the token seed in encrypted form, wherein an encryption key used to generate the encrypted form is based on a combination of a secret key, the unique device ID and a hardcoded-pre-shared key;

binding in a persistent manner the token seed to the mobile device by encrypting the token seed based on the unique device ID; and when the token is requested by the user, generating, by the soft token application, the token based on the bound token seed.

12. The non-transitory computer-readable storage medium of claim 11, wherein said generating the token based on the bound token seed comprises:

programmatically obtaining, by the soft token application, the unique device ID via the API;

obtaining the token seed from the bound token seed by decrypting, by the soft token application, the bound token seed based on the unique device ID; and invoking, by the soft token application, a token generation function with the token seed as an input to the token generation function.

13. The non-transitory computer-readable storage medium of claim 12, wherein the mobile device comprises a smartphone and wherein the unique device ID comprises a Unique Device Identifier (UDID), an International Mobile Equipment Identity (IMEI) or a Mobile Equipment Identifier (MEI).

14. The non-transitory computer-readable storage medium of claim 11, wherein the activation code is received by the mobile device from the authentication server via a first out-of-band channel.

15. The non-transitory computer-readable storage medium of claim 14, wherein the first out-of-band channel comprises electronic mail (email).

16. The non-transitory computer-readable storage medium of claim 14, wherein the method further comprises:

receiving, by the user from the provisioning server via a second out-of-band channel, the secret key;

prior to said requesting, by the soft token application via an IP-based network, a token seed from a provisioning server, prompting the user, by the soft token application, for the secret key.

17. The non-transitory computer-readable storage medium of claim 16, wherein the second out-of-band channel comprises Short Message Service (SMS).

18. The non-transitory computer-readable storage medium of claim 11, wherein the token comprises a One-Time Password (OTP).

19. The non-transitory computer-readable storage medium of claim 18, wherein the OTP comprises a time-based OTP.

\* \* \* \* \*